(12) United States Patent
Klingler

(10) Patent No.: US 8,275,474 B2
(45) Date of Patent: Sep. 25, 2012

(54) FLEXIBLE MULTICHANNEL OUTPUTS FOR DUAL AUDIO DECODE

(75) Inventor: Keith LaRell Klingler, Poway, CA (US)

(73) Assignee: Broadcom Corporation, Irvine, CA (US)

( * ) Notice: Subject to any disclaimer, the term of this patent is extended or adjusted under 35 U.S.C. 154(b) by 1055 days.

(21) Appl. No.: 11/581,394

(22) Filed: Oct. 17, 2006

(65) Prior Publication Data

US 2008/0091287 A1    Apr. 17, 2008

(51) Int. Cl.
*G06F 17/00* (2006.01)

(52) U.S. Cl. .......................................... 700/94; 381/119

(58) Field of Classification Search ..................... 700/94; 381/119; 369/1–12
See application file for complete search history.

(56) References Cited

U.S. PATENT DOCUMENTS

| | | | |
|---|---|---|---|
| 5,928,342 A * | 7/1999 | Rossum et al. | 710/74 |
| 7,078,608 B2 * | 7/2006 | Aiso et al. | 84/625 |

* cited by examiner

*Primary Examiner* — Andrew C Flanders
(74) *Attorney, Agent, or Firm* — Duane S. Kobayashi

(57) ABSTRACT

A system and method for flexibly outputting audio from a plurality of programs to the particular outputs that are desired for each audio stream. This routing flexibility enables the audio system to operate in a variety of configured usage modes, wherein each usage mode identifies the routing of each audio stream to one or more outputs such as SPDIF, HDMI, I2S, and DAC.

18 Claims, 8 Drawing Sheets

FLEXIBLE MULTICHANNEL OUTPUTS FOR DUAL AUDIO DECODE

BACKGROUND

1. Field of the Invention

The present invention relates generally to audio outputs and, more particularly, to the implementation of flexible multichannel outputs for dual audio decode.

2. Introduction

Set top boxes (STBs) for satellite and digital cable have various audio outputs. These various audio outputs enable audio for a program to be delivered on one or more outputs simultaneously. For conventional STBs that can handle only a single program, there is no flexibility to simultaneously play a second program.

Current STBs are being called upon to support a greater variety of audio outputs. Users often need flexibility in outputting an audio program to various devices. What is needed therefore is a system and method that enables audio for a program to be flexibly applied to one or more outputs. What is also needed is a system and method that enables flexible delivery of audio for multiple programs to the set of audio outputs. This flexible delivery of audio for multiple programs would enable multiple listeners to simultaneously hear different programs through separate audio devices.

SUMMARY

A system and/or method for flexible multichannel outputs for dual audio decode, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Audio systems can be designed to support a variety of audio outputs, including the Sony/Philips Digital Interconnect Format (SPDIF), multi-format audio interface (MAI) such as High-Definition Multimedia Interface (HDMI), Inter-IC Sound (I2S), analog outputs, or the like. It is a feature of the present invention that audio from a plurality of programs can be flexibly routed to the particular outputs that are desired for each audio stream. This flexibility enables the audio system to operate in a variety of configured usage modes, wherein each usage mode identifies the routing of each audio stream to one or more outputs.

Figure 1:
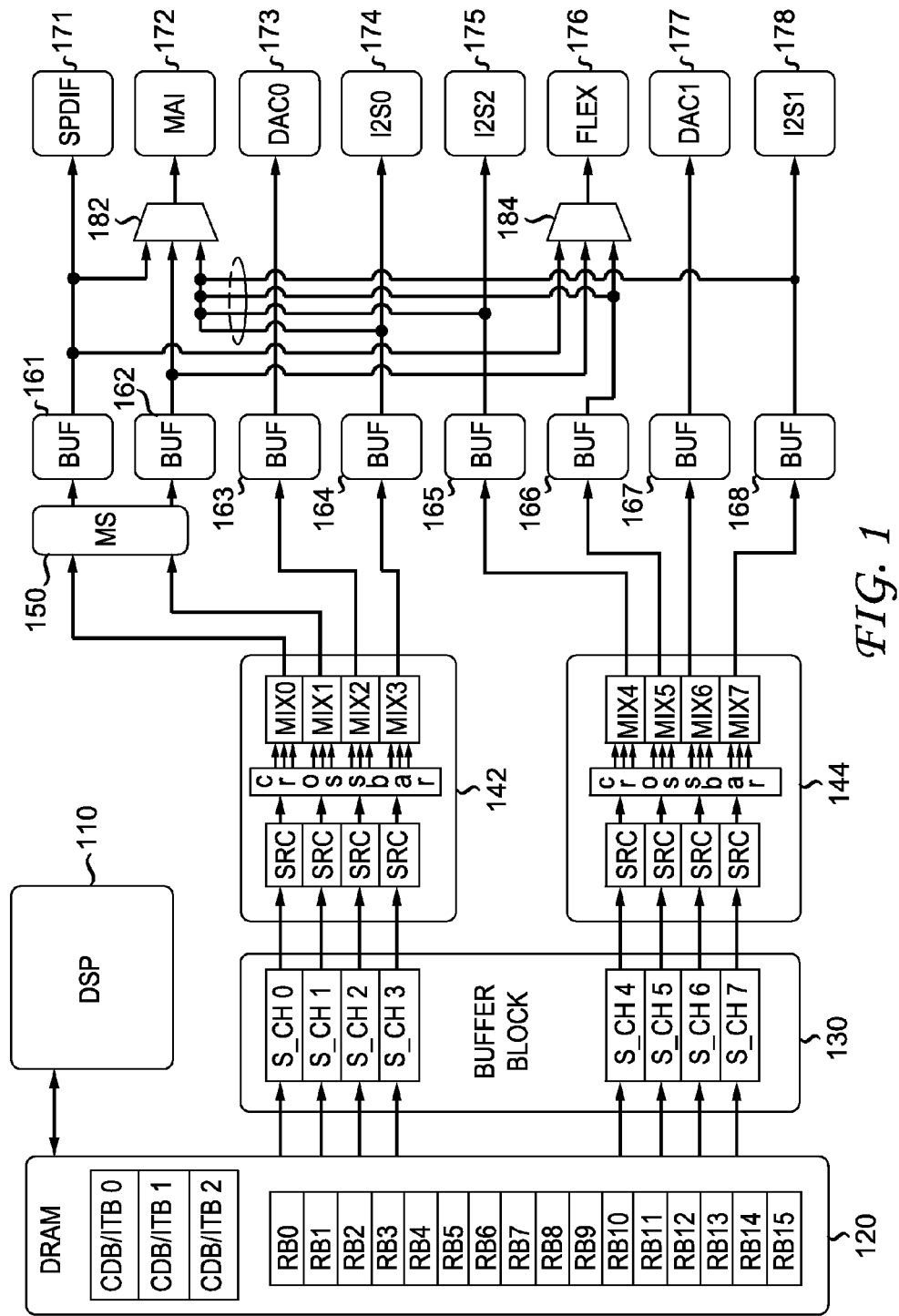
FIG. 1 illustrates an embodiment of an audio delivery system in accordance with the present invention.

To illustrate these features of the present invention, reference is made to the example audio output system embodiment of FIG. 1. As illustrated, the audio output system of FIG. 1 includes digital signal processor (DSP) block 110, which can be configured to simultaneously decompress one or more compressed streams (e.g., MPEG, Dolby Digital, MPEG-2 AAC, MPEG-4 AAC, and Dolby Digital Plus audio services). As will be described in greater detail below, DSP 110 can be configured to simultaneously decompress two compressed streams. As will also be described in greater detail below, the simultaneous decompressing of two compressed streams enables DSP 110 to simultaneously output two distinct audio streams on two different audio outputs. For example, DSP 110 can enable the output of a first digital audio service in compressed form on SPDIF and a second digital audio service in a non-compressed form on HDMI.

In operation, DSP 110 retrieves a compressed audio stream that is stored in compressed data buffer and index table buffer pair N (CDB/ITB-N) of DRAM 120. The processing actions performed by DSP 110 on the compressed audio stream would depend on the intended audio output(s) to which the audio stream would be delivered. For example, the retrieved audio stream data can be decoded and downmixed into uncompressed stereo for delivery to SPDIF, HDMI, digital-to-analog converter (DAC), or I2S outputs, decoded and separated into multichannel outputs (e.g., 5.1 or 7.1 audio) for delivery to HDMI or I2S outputs, packed for delivery to SPDIF output, variably delayed for different outputs, converted to another format (e.g., AC3) for delivery, etc.

The processed audio stream generated by DSP 110 is then stored in selected ring buffer(s) (i.e., RB0-RB15) of memory 120. A ring buffer can be designed to store mono, interleaved stereo, or paired with another ring buffer for separate left/right channels. For example, RB1 and RB9 can be selected to store the left and right audio channels for the processed audio stream. It should also be noted that a ring buffer pair can be used to store unprocessed data such as audio effect data that is to be subsequently combined with other processed audio stream data stored in ring buffers in memory 120. As will be described in greater detail below, this mixing can occur in data path blocks 142, 144.

Audio stream data stored in ring buffers RB0-RB15 are retrieved and stored in source channels 0-7 (S_CH0-S_CH7) of buffer block 130, which can provide a time delay with optional adaptive rate filtering. Here, each of S_CH0-S_CH7 stores a pair of audio channels. Audio stream data stored in buffer block 130 is then provided to data path blocks 142, 144.

In general, different arrangements of ring buffers and/or source channels can be used other than those illustrated in FIG. 1. In a dual-decode configuration embodiment, however, the resources can be allocated as follows:

S_CHn uses ring buffer n for single mode, ring buffers n and n+8 for shared mode S_CH0, ring buffer 0—main compressed (ring buffers 0,8 for MSYNC PCM data)

S_CH1, ring buffers 1(,9)—main effects

S_CH2, ring buffers 2,10—main PCM

S_CH3, ring buffer 3—main Dolby Digital Plus compressed (ring buffers 3,11 for MSYNC PCM)
S_CH4, ring buffer 4—secondary compressed (ring buffers 4,12 for SSYNC PCM data)
S_CH5, ring buffers 5(,13)—secondary effects
S_CH6, ring buffers 6,14—secondary PCM
S_CH7, ring buffer 7—secondary Dolby Digital Plus compressed (ring buffers 7,15 for SSYNC PCM)

In general, data path blocks 142, 144 provide mixing and multiplexing of audio stream data. In the embodiment of FIG. 1, each data path block 142, 144 is designed to support four input audio streams and four output audio streams. Each data path block 142, 144 is also designed to allow up to three inputs to be mixed for each output. More specifically, each output can represent a mix of three independently selected inputs. For example, MIX0 can represent a mix of inputs 1, 2, and 4, while MIX1 can represent a mix of inputs 2, 3, and 4. The independent selection of inputs for each output is facilitated by a crossbar switch. As would be appreciated, the specific number of input and output audio streams chosen as well as the extent of the mixing capabilities for the outputs would represent implementation dependent design decisions.

In one embodiment, data path blocks 142, 144 can support distinct time bases and sample rates on each output. Data path blocks 142, 144 can also perform a low-fidelity sample rate conversion intended for matching the sample rate on sound effects to the sample rate of the decoded or analog audio.

As illustrated in FIG. 1, the mixers (MIX0-MIX3) in data path block 142 and the mixers (MIX4-MIX7) in data path block 144 each feed selected audio buffers 161-168 that are each associated with particular audio output destinations. In one embodiment, the audio system supports a variety of output destinations including the following:

Main and Second Analog Outputs with optional SRS (DAC0, DAC1)
Digital Output—Main or Secondary (SPDIF)
Digital Output—Main or Secondary (HDMI)
Main, Second, and Third I2S output for external DAC (may also use for 6- or 8-channel audio)
Flex output In the illustrated embodiment, buffer 161 is associated with SPDIF generator 171, buffer 162 is associated with MAI bus 172, buffer 163 is associated with audio DAC0 173, buffer 164 is associated with I2S0 converter 174, buffer 165 is associated with I2S2 converter 175, buffer 166 is associated with flex converter 176, buffer 167 is associated with audio DAC1 177, and buffer 168 is associated with I2S1 converter 178.

As is further illustrated, selector 182 can be used to couple buffer 161 with MAI bus 172. Selector 182 therefore enables the audio stream data routed to SPDIF generator 171 to also be routed to MAI bus 172. Selector 182 can also be configured to route multichannel outputs (e.g., 5.1 or 7.1 audio) for delivery to MAI bus 172. As illustrated, these multichanel outputs are routed from buffers 164, 165, 166, and 168 as a four-pair bus to MAI 172. Here, it should be noted that the actual multiplexing can take place in the MAI formatter. Selector 184, on the other hand, can be used to couple buffers 161 and 162 to flex converter 176. Selector 184 therefore enables the audio stream data routed to SPDIF generator 171 or MAI bus 172 to also be routed to flex converter 176. The various routing possibilities enabled by the audio system of FIG. 1 will be described in greater detail below.

It should be noted that the MIX0 and MIX1 output from data path block 142 are routed to micro sequencer (MS) 150 prior to buffers 161 and 162. In general, MS 150 is designed to handle the bit stream packing for SPDIF generator 171 and MAI bus 172.

The audio system framework of FIG. 1 enables audio stream data from one or more programs to be output to one or more of SPDIF, HDMI, I2S, DAC, and flex audio outputs. The particular routing of audio programs to the various outputs can be based on defined configurations of the audio system, wherein each configuration describes how to connect various sources to each particular output. In this framework, independent of the source of the audio, the configurations can define various output options. For example, audio stream data can be output in analog format through one or both of the two stereo DAC blocks, the audio stream data can be output over an I2S for connection to an off-chip DAC, the audio stream data can be output on SPDIF for digital connection to an A/V amplifier/receiver, or the audio stream data can be combined with video via an HDMI interface.

Figure 2:
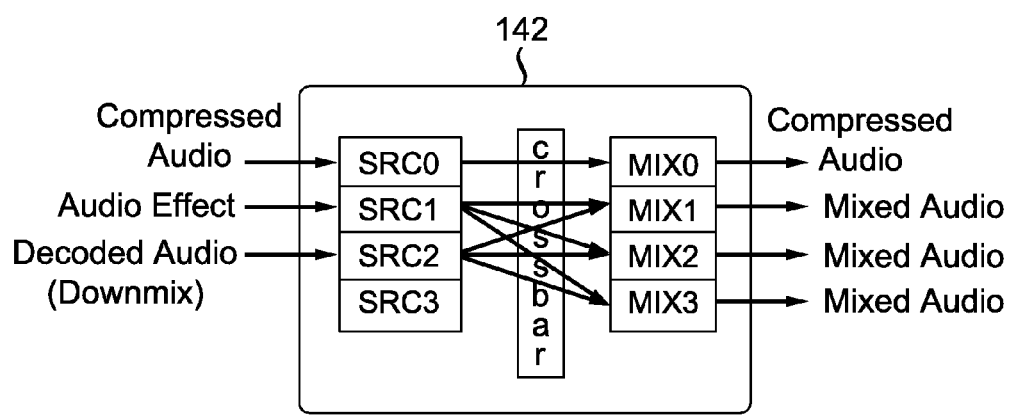
FIG. 2 illustrates an embodiment of an audio switching block.

The flexible routing framework of the present invention is enabled in part by the switching capabilities of data path blocks 142, 144. To illustrate the operation of data path blocks 142, 144 in greater detail, reference is now made to the illustration of FIG. 2, which shows an example configuration of data path block 142.

As illustrated, data path block 142 includes four inputs (SRC0-SRC3), three of which (SRC0-SRC2) are configured to receive compressed audio, audio effect, and decoded audio (downmix) inputs, respectively. The three audio inputs are then routed to the appropriate mixers (MIX0-MIX3) as follows: MIX0 is coupled solely to input SRC0, MIX1 is coupled to inputs SRC1 and SRC2, MIX 2 is coupled to inputs SRC1 and SRC2, and MIX 3 is coupled to inputs SRC1 and SRC2. As this example demonstrates, each of mixers MIX0-MIX3 can be independently coupled to up to three of inputs SRC0-SRC3. Here, MIX0 is coupled to one input SRC0, and each of MIX1-MIX3 are coupled to the two inputs SRC1 and SRC2. The effect of this configuration of the crossbar is that the compressed audio is passed on to MIX0 for delivery, for example, to SPDIF and MAI outputs, while the audio effect and the downmixed decoded audio are each mixed in MIX1-MIX3 to produce a mixed audio output that can be delivered, for example, to DAC or I2S outputs.

Figure 3:
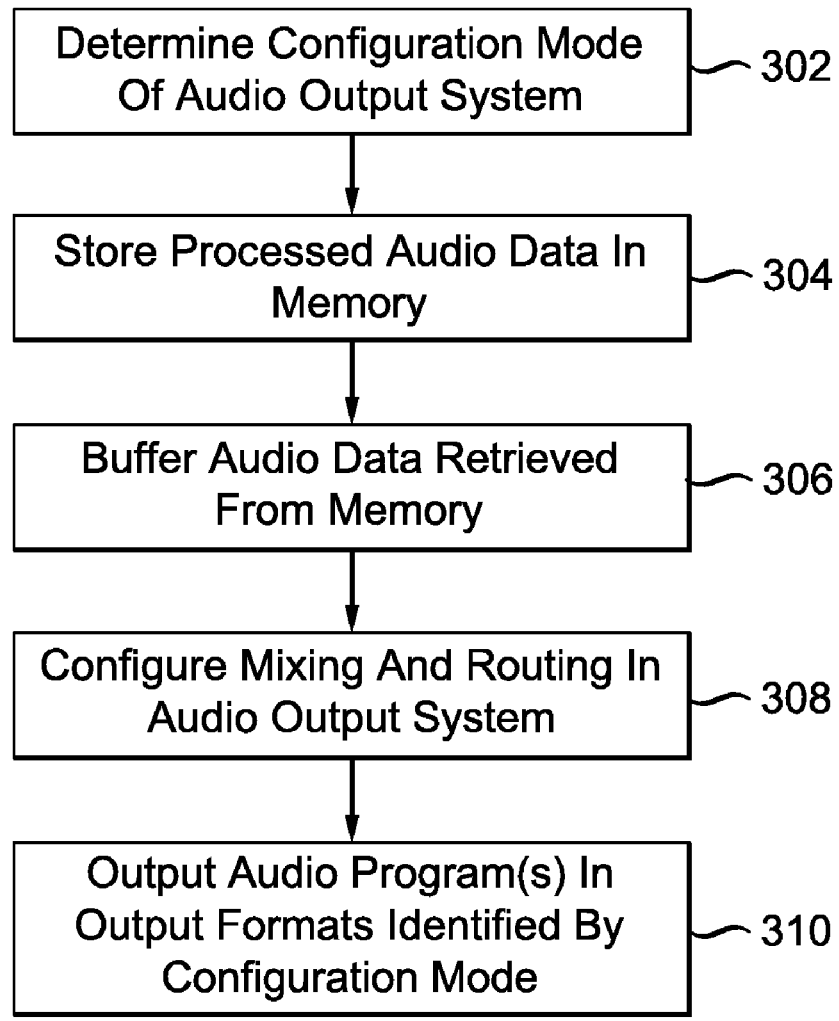
FIG. 3 illustrates a flowchart of a process of flexibly delivering audio program(s) to various audio outputs.

As has been described, the flexible routing of audio streams to selected outputs can be enabled through defined configuration modes. The use of such defined configuration modes is described now with reference to the flowchart of FIG. 3. As illustrated, the process begins at step 302, where a configuration mode for the audio output system is determined. This configuration mode can be used to identify the particular inputs to be generated and the routing of such inputs to the selected outputs. For example, one configuration mode can be defined such that the main compressed data is decoded and mixed with an audio effect and sent to SPDIF, HDMI, I2S0, and DAC0 outputs. In another example, a configuration mode can be defined such that the main compressed data is decoded and mixed with an audio effect and sent to I2S0 and DAC0 outputs, while compressed data is passed through to SPDIF and HDMI outputs.

Once the configuration mode is determined, at step 304, DSP 110 processes the audio data and stores it in memory 120. The extent of the processing performed by DSP 110 is based on the determined configuration mode. If the configuration mode specifies that only uncompressed stereo is to be sent to one or more output destinations, than DSP 110 would decode the compressed data. If the configuration mode specifies that AC3 data is to be delivered to the SPDIF output in addition to uncompressed stereo, than DSP 110 would convert compressed data to the AC3 format and decode the compressed data.

Next, at step 306, the audio data is retrieved from memory and buffered in buffer block 130. More specifically, audio data is transferred from ring buffers in memory 120 to source channels in buffer block 130. As illustrated in the embodiment of FIG. 1, the source channels S_CHn are associated with input sources of data path blocks 142, 144. Accordingly, the source channel S_CHn is chosen at least in part on the configuration mode of the audio system.

At step 308, the mixing and path routing in the audio system is configured in accordance with the configuration mode. As described with reference to FIG. 2, this mixing and path routing is based in part on the configuration of the crossbar switches within data path blocks 142, 144. These crossbar switches dictate the particular set of input sources that are to be mixed in each mixer. The output of those mixers is then passed on to their respective buffers. From here, as illustrated in the embodiment of FIG. 1, further path routing can be determined by selectors 182 and 184. These selectors determine the specific outputs that are transferred to the output destinations 171-178. For example, selector 182 can determine whether the audio stream sent to SPDIF generator 171 is also sent to MAI bus 172. Once the mixing and path routing is configured, at step 310, the audio system can then output the audio stream data from one or more programs in the output formats identified by the configuration mode.

Having described the process of configuring the audio output system in accordance with a determined configuration mode, a description of various example configuration modes is now described with reference to FIGS. 4A-4E.

Figure 4A:
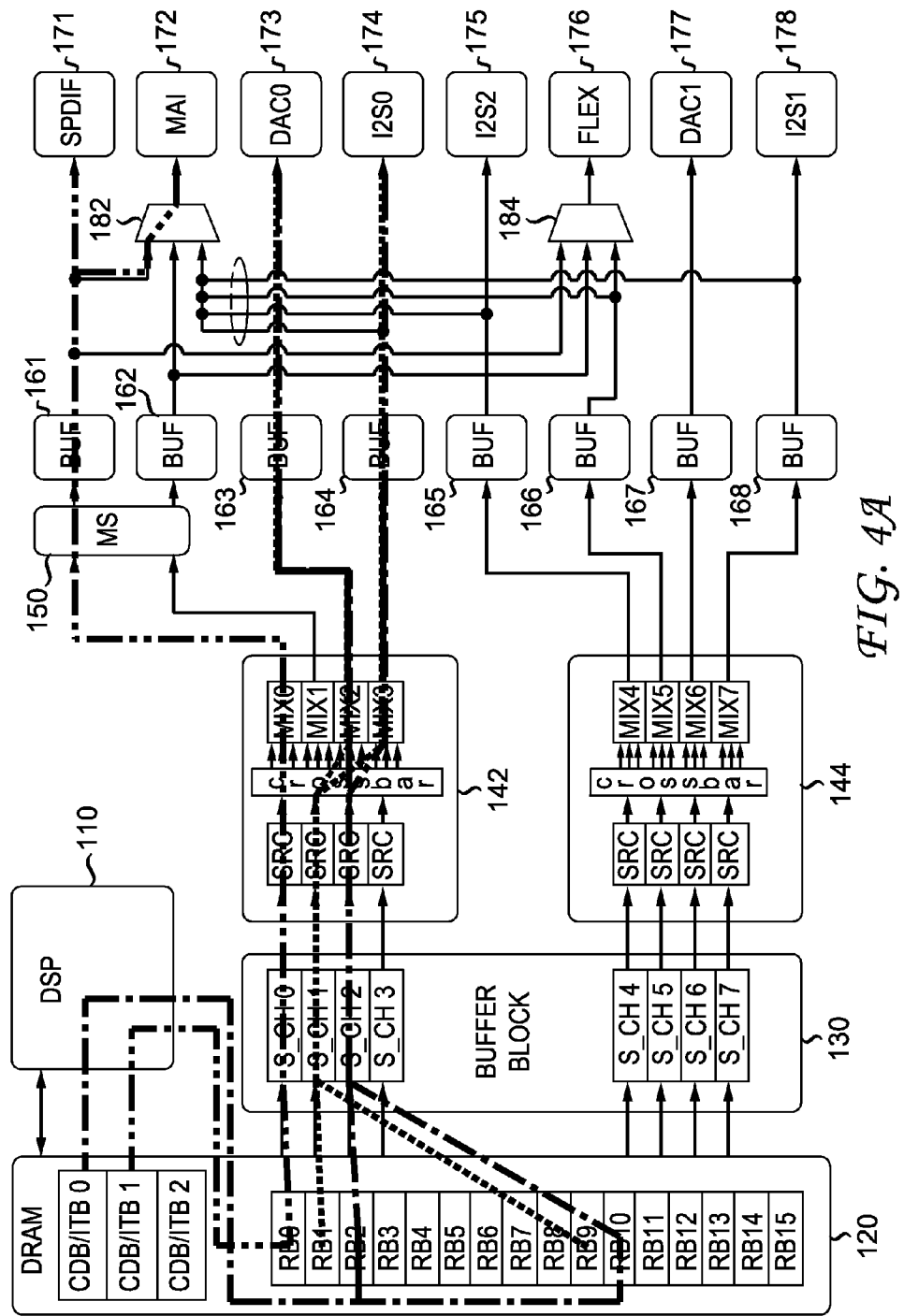
FIGS. 4A-4E illustrate example usage modes that are enabled through the audio delivery system of the present invention.

FIG. 4A illustrates a configuration mode that decodes compressed data (shown in red) and sends it to I2S0 and DAC0. The sound effects (shown in blue) are stored in RB1 and RB9, while the decoded data is stored in RB2 and RB10. The sound effect data is passed through S_CH1 and sent to MIX2 and MIX3 via the crossbar of data path block 142. The decoded data is passed through S_CH2 and also sent to MIX2 and MIX3 via the crossbar of data path block 142. Both the decoded data and the sound effect data are then mixed by MIX2 and MIX 3 to produce mixed data (shown in purple). This mixed data is then routed to audio DAC0 173 and I2S0 converter 174 via buffers 163 and 164, respectively.

As further illustrated in FIG. 4A, the compressed data (shown in yellow) can also be passed through to SPDIF and HDMI outputs. Specifically, the compressed data is stored in RB0 and is passed through S_CH0 to MIX0. From MIX0, the compressed data is sent through MS 150, through buffer 161 and onto SPDIF generator 171. Selector 172 is also configured to route the output of buffer 161 to MAI bus 172. This example configuration mode can be used for Dolby Digital data where an advanced HDMI receiver is available that understands compressed Dolby Digital data.

Figure 4B:
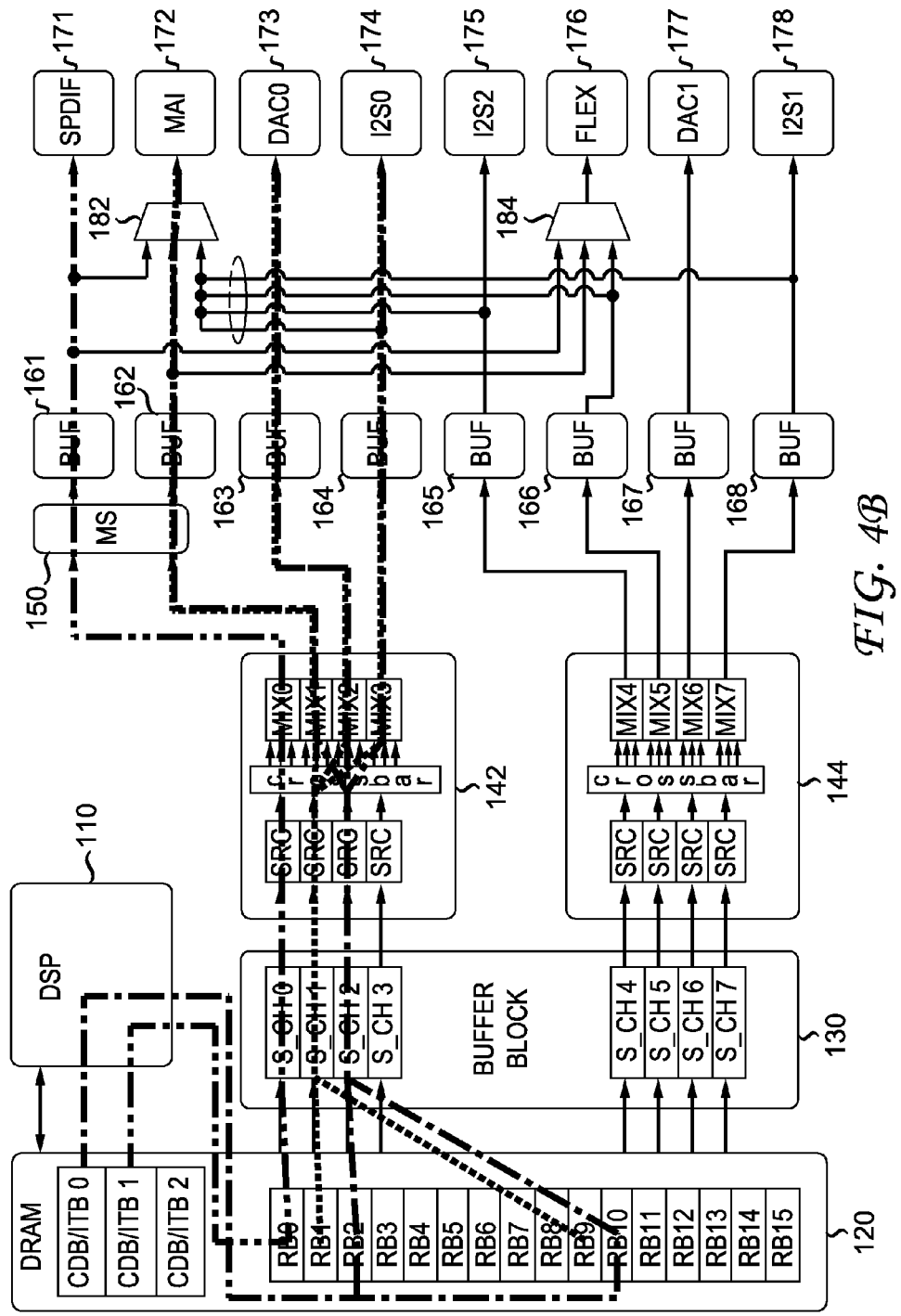

FIG. 4B illustrates a configuration mode that sends decoded data to audio DAC0 173 and I2S0 converter 174, and sends compressed data to SPDIF generator 171, in the same manner as the configuration mode of FIG. 4A. MAI bus 172, on the other hand, receives decoded data instead of compressed data. Specifically, the crossbar of data path block 142 now routes downmixed and decoded data to MIX1 in addition to MIX2 and MIX3. MIX2 then passes the mixed data (shown in purple) output by MIX1 to MAI bus 172 via MS 150 and buffer 162. Unlike the configuration mode of FIG. 4A, selector 172 is now configured to select the output generated by buffer 162, instead of buffer 161.

As thus described, the configuration mode of FIG. 4B decodes compressed data, mixes it with sound effect data, and sends it to I2S0, DAC0, and HDMI. The compressed data, on the other hand, is passed through to SPDIF (shown in gold). This configuration mode could be used, for example, for Dolby Digital data when the HDMI receiver is only capable of processing PCM data.

Figure 4C:
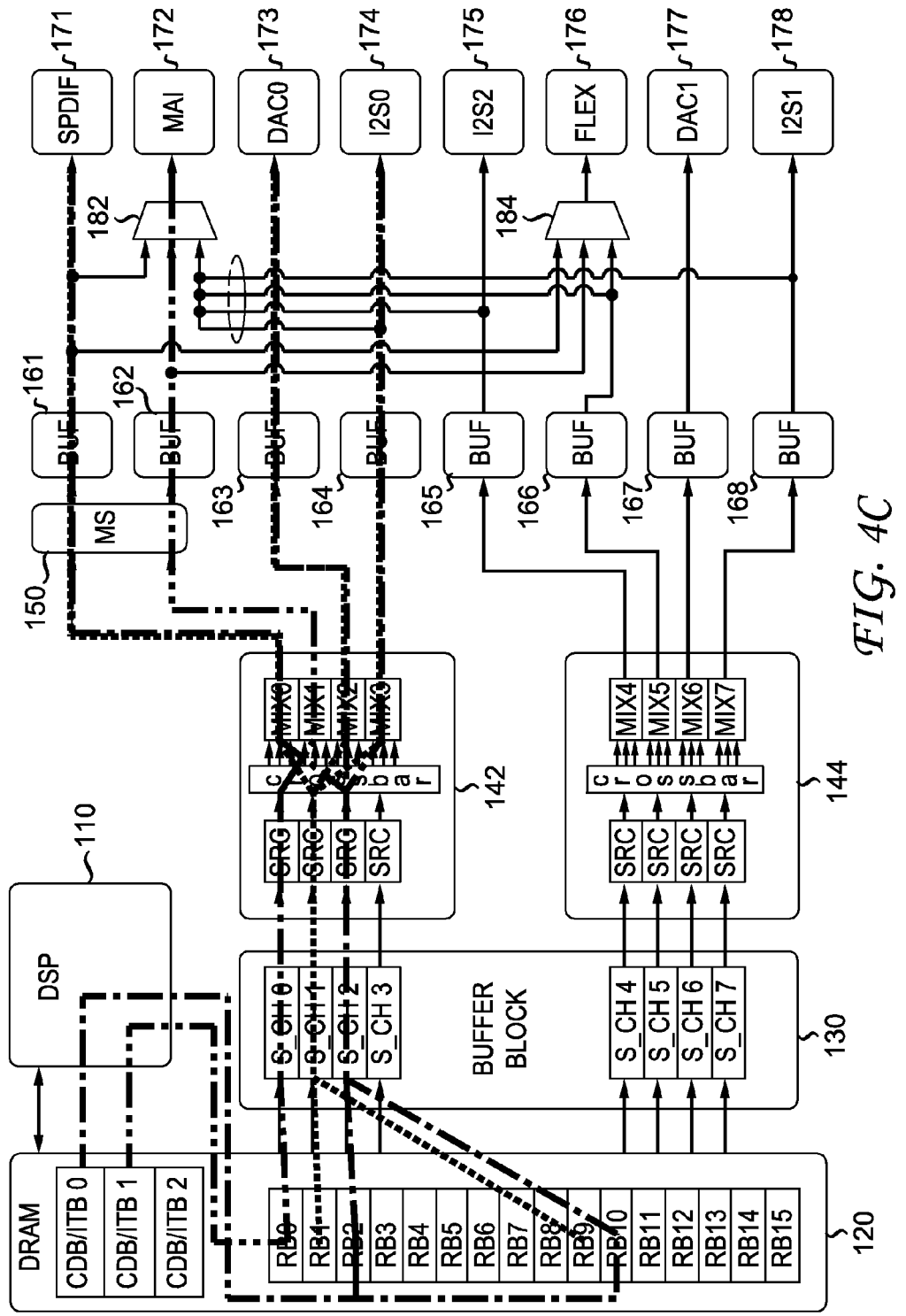

FIG. 4C illustrates a configuration mode that sends decoded data to audio DAC0 173 and I2S0 converter 174 in the same manner as the configuration mode of FIG. 4A. In this configuration mode, however, SPDIF generator 171 receives decoded data instead of compressed data. Thus, the crossbar of data path block 142 routes both the decoded data and audio effect data to MIX0, which then sends the mixed data (shown in purple) to SPDIF generator 171 via MS 150 and buffer 161. The crossbar of data path block 142 has also been configured such that compressed data (shown in gold) is now routed from S_CH0 to MIX1. MIX1 then outputs the compressed data to MAI bus 172 via MS 150 and buffer 162.

As thus described, this configuration mode decodes compressed data and sends it to I2S0, DAC0, and SPDIF. The compressed data, on the other hand, is passed through to HDMI. This configuration mode could be used for advanced compressed formats when the HDMI receiver has more capabilities than the SPDIF receiver.

Figure 4D:
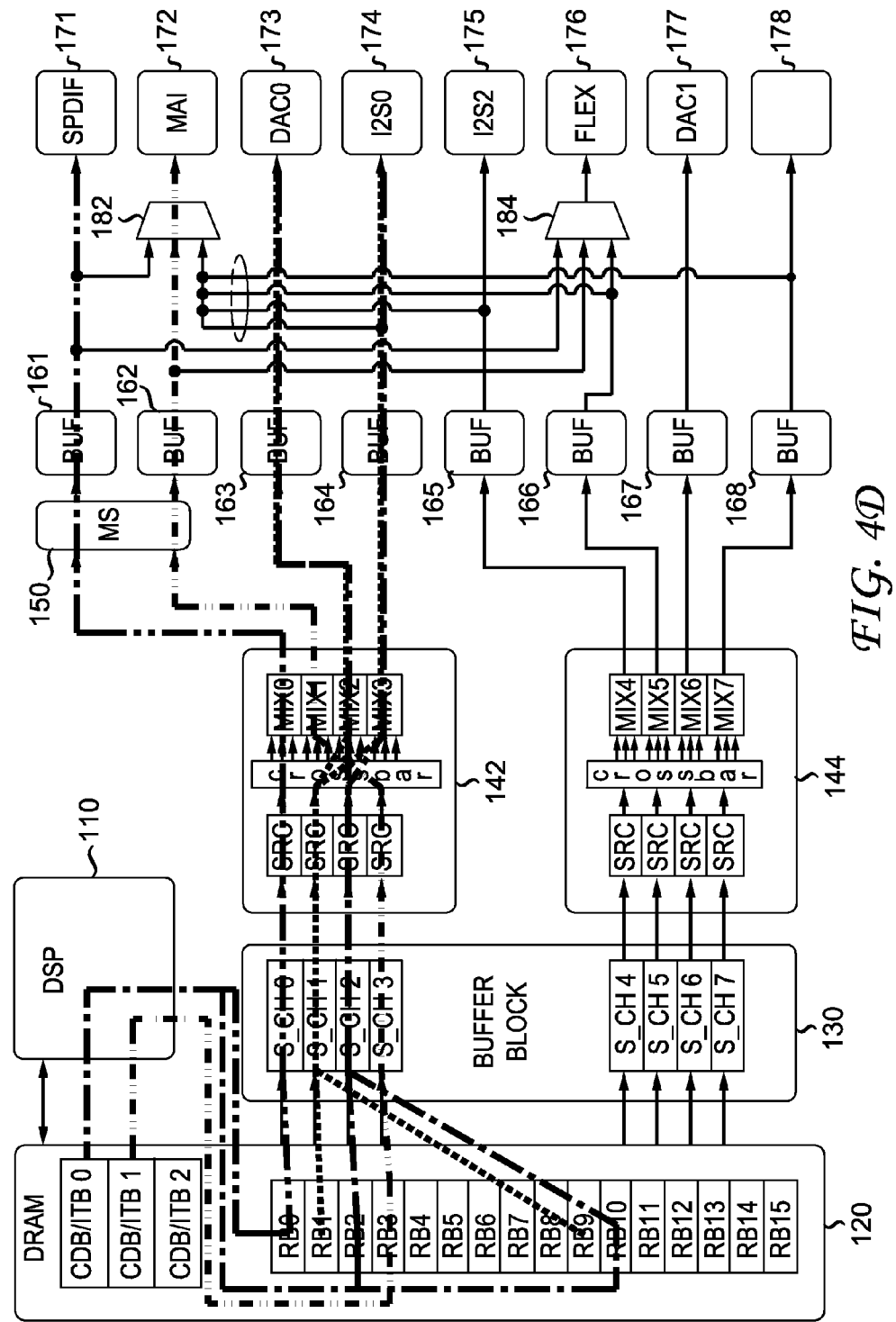

FIG. 4D illustrates a configuration mode that sends decoded data to audio DAC0 173 and I2S0 converter 174 in the same manner as the configuration mode of FIG. 4A. In this configuration mode, however, SPDIF generator 171 receives compressed data (e.g., Dolby Digital Plus) that has been converted to AC3 format (shown in gold). This converted AC3 data is stored in RB0 and is passed through S_CH0 to MIX0. From MIX0, the converted AC3 data is sent through MS 150, through buffer 161 and onto SPDIF generator 171. The compressed data (shown in green) is also formatted for delivery to MAI bus 172. Specifically, the compressed data is stored in RB3 and is input to S_CH3. The crossbar of data path block 142 then routes the compressed data to MIX1, which then sends the compressed data to MAI bus 172 via MS 150 and buffer 162.

As an example, this configuration can decode Dolby Digital Plus (DDP) compressed data and send it to DAC0 and I2S0. The compressed DDP data is also passed through to HDMI, while DDP data converted to AC3 is passed through to SPDIF.

Figure 4E:
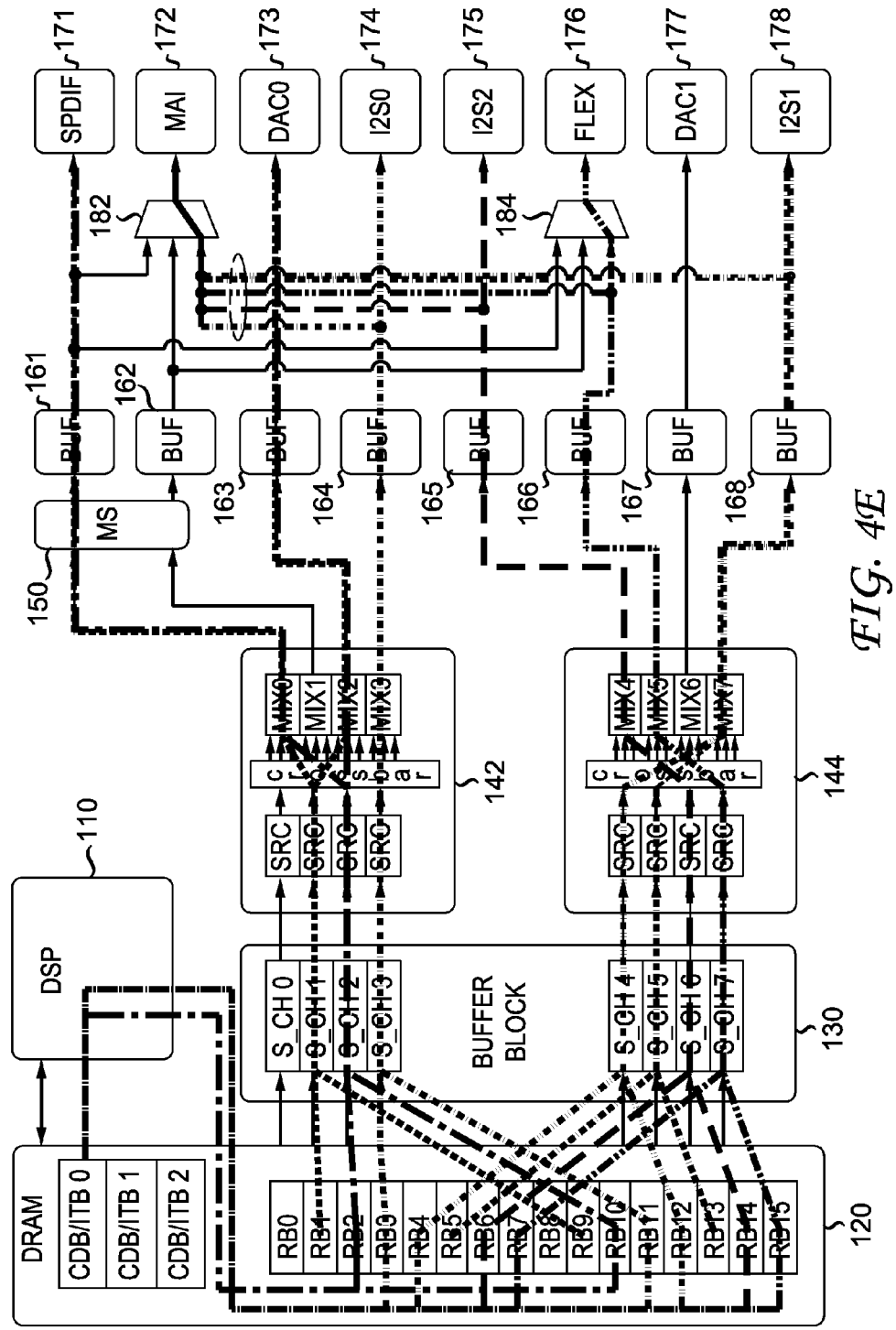

FIG. 4E illustrates a configuration mode that decodes compressed data containing eight PCM channels (shown in brown). The decoded and downmixed compressed data (shown in red) is combined with sound effect data (shown in blue) in MIX0 and MIX2. The mixed data (shown in purple) is then routed to audio DAC0 173 and SPDIF generator 171 via buffers 161 and 163, respectively.

Front left and right channels (shown in green) are sent to I2S0. Specifically, the left and right channels are stored in RB3 and RB11 and passed to MIX3 via S_CH3. MIX3 then outputs the left and right channels to I2S0 converter 174 via buffer 164. LFE and center channels (shown in turquoise), stored in RB4 and RB12, are mixed with sound effects 1 (shown in olive), stored in RB5 and RB13. The mix results generated by MIX7 are then sent to I2S1 converter 178 via buffer 168. The rear left and right channels (shown in pink) are stored in RB6 and RB14 and are passed to MIX 4 via S_CH6. MIX 7 then outputs the rear left and right channels to I2S2 converter 175 via buffer 165. The front left of center (FLC) and front right of center (FRC) channels (shown in orange) are stored in RB7 and RB15 and are passed to MIX 5 via S_CH5. MIX 7 then outputs the FLC and FRC channels to flex converter 176 via buffer 166. The LFE, center, rear left, rear right, FLC and FRC channels can then be combined to go out on the I2S1 pins. Additionally, the eight channels (FL, FR, LFE, center, rear left, rear right, FLC and FRC) can also be coupled to MAI bus 172 for transport via HDMI. As would be appreciated, six-channel HDMI would be similar to eight-channel HDMI except that the FLC and FRC channels would not be used.

It should be noted that in this multichannel configuration, it is important that the I2S outputs be synchronized. If underflow occurs on any of the multichannel audio streams, then output channels can be out-of-phase, and the hardware may need to be restarted to realign.

As these examples illustrate, the principles of the present invention enable significant flexibility in the routing of audio streams to various outputs. These audio streams can represent compressed or uncompressed data from main or secondary audio sources.

This flexibility is particularly evident when considering audio streams that are output to MAI bus 172 for HDMI transport. This audio data can be compressed surround (e.g., 5.1 or 7.1) or uncompressed stereo, both of which could also be sent to SPDIF generator 171. Alternatively, the compressed surround or uncompressed stereo can be generated solely for MAI bus 172 (i.e., distinct from SPDIF generator 171). Further, the audio output system can also transport uncompressed multichannel surround to MAI bus 172 for HDMI transport. Thus, the flexibility of the audio output system of the present invention supports multiple forms of HDMI transport.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. An audio output system, comprising:
a digital signal processor that processes a plurality of audio stream data and stores said plurality of processed audio stream data in a plurality of ring buffers;
a buffer that stores data for a plurality of input source channels, a first of said plurality of input source channels being designed to receive processed audio stream data from one or more ring buffers that are linked to said first input source channel;
a switching block that has a plurality of audio inputs, a plurality of mixers, and a crossbar coupled to said plurality of audio inputs and said plurality of mixers, each of said plurality of audio inputs being linked with one of said plurality of input source channels, at least one of said plurality of mixers being linked to a single audio output that is one of Sony/Philips Digital Interconnect Format, multi-format audio interface, Inter-IC Sound, and digital-to-analog converter, at least one of said plurality of mixers being operative to mix two or more of said plurality of audio inputs to produce an audio output, said crossbar capable of coupling one of said plurality of audio inputs to two or more of said plurality of mixers based on an operating mode of the audio output system, wherein said operating mode selectively routes an audio program on one of said plurality of audio inputs to two or more audio outputs.

2. The system of claim 1, wherein a mixer mixes a first audio program on a first audio input with a second audio program on a second audio input for output on a first audio output.

3. The system of claim 2, wherein said second audio program is an audio effect.

4. The system of claim 1, further comprising a microsequencer that handles bit stream packing for SPDIF and HDMI destinations.

5. The system of claim 1, wherein a first audio output from said switching block is routed to a SPDIF destination, further comprising a selector that routes either said first audio output and a second audio output to a HDMI destination.

6. The system of claim 1, wherein said switching block receives a first audio program on a first audio input and a second audio program on a second audio input, said switching block coupling said first audio program to a first audio output and said second audio program to a second audio output.

7. The system of claim 6, wherein said first audio program carries compressed audio data and said second audio program carries uncompressed audio data.

8. The system of claim 1, wherein said switching block receives a first pair of channels from an uncompressed multi-channel audio program on a first audio input and a second pair of channels from said uncompressed multi-channel audio program on a second audio input, said first and second audio inputs being coupled by said switching block to separate I2S destinations.

9. The system of claim 1, wherein said switching block receives a first pair of channels from an uncompressed multi-channel audio program on a first audio input and a second pair of channels from said uncompressed multi-channel audio program on a second audio input, said first and second audio inputs being coupled by said switching block to an HDMI destination.

10. The system of claim 1, wherein said switching block couples an audio program received on a first audio input to a first audio output intended for a SPDIF destination and a second audio output intended for an HDMI destination.

11. The system of claim 10, wherein said audio program is compressed audio data.

12. The system of claim 1, wherein said audio program is uncompressed stereo.

13. An audio output method, comprising:
receiving an audio program on one of a plurality of input source channels of a buffer;
routing said received audio program to one of a plurality of audio inputs in a switching block, said one of said plurality of input source channels being linked with said one of said plurality of audio inputs of said buffer;
identifying a mode of operation;
selectively coupling said received audio program to a plurality of mixers in said switching block based on said identified mode of operation, each of said plurality of mixers being operative to mix one or more audio programs that are routed to said mixer via a crossbar in said switching block; and
outputting, by a first of said plurality of mixers, a first mix to a first audio output and outputting, by a second of said plurality of mixers, a second mix to a second audio output, said second audio output being associated with a single type of audio destination.

14. The method of claim 13, wherein said coupling comprises coupling said audio program to a plurality of mixers that output said audio program to a plurality of SPDIF, HDMI, DAC, and I2S destinations.

15. The method of claim 13, further comprising receiving an audio effect on a second audio input of said switching block, and selectively coupling said audio effect to said plurality of mixers based on said identified mode of operation, wherein each of said plurality of mixers mix said audio effect with said audio program.

16. A audio output method, comprising:
receiving a first audio program on a first of a plurality of input source channels of a buffer, and a second audio program on a second of said plurality of input source channels of said buffer;
routing said first audio program and said second audio program to first and second audio inputs of a switching section, said first audio input being coupled to said first input source channel and said second audio input being coupled to said second input source channel, wherein said switching section includes at least one crossbar coupled to said first and second audio inputs, and a plurality of mixers coupled to a respective plurality of audio outputs, each of said plurality of mixers being operative to mix one or more audio inputs that are routed to said mixer via said at least one crossbar and outputting said mix to a respective audio output;
identifying a first mode of operation;
selectively coupling, based on said identified first mode of operation, said first audio program to a first and a second of said plurality of mixers and said second audio program to a said first and said second of said plurality of mixers;
outputting a first mix produced by said first of said plurality of mixers to a first audio output; and
outputting a second mix produced by said second of said plurality of mixers to a second audio output.

17. The method of claim 16, wherein said first of said plurality of mixers is coupled to one of SPDIF, HDMI, DAC, and I2S destinations, and said second of said plurality of mixers is coupled to a different one of said SPDIF, HDMI, DAC, and I2S destinations.

18. The method of claim 16, wherein said second audio program is an audio effect.

* * * * *